United States Patent Office 3,485,722
Patented Dec. 23, 1969

3,485,722
FERMENTATIVE PROCESS FOR PRODUCING ERGOCRYPTINE
Alba Maria Amici, Via Marigi N. 13; Anacleto Minghetti, P.zza Vesuvio N. 23; Tullio Scotti, Via G. del Maino N. 21; Celestino Spalla, Via L. Soderini N. 21; and Luigi Tognoli, Via Fiardalisi N. 10; all of Milan, Italy
No Drawing. Filed July 18, 1967, Ser. No. 654,089
Claims priority, application Italy, July 22, 1966, 16,948/66
Int. Cl. C12k 1/10; C12b 1/08
U.S. Cl. 195—81          2 Claims

ABSTRACT OF THE DISCLOSURE

Described is a microbiologic process for the preparation of ergocryptine in which the microorganism *Claviceps purpurea* F.I. 101a (ATCC 20019) is cultivated in submerged culture under aerobic conditions in a liquid nutritive medium containing a source of carbon, nitrogen, and mineral salts.

---

The present invention relates to a new microbiological method for the preparation of ergocryptine. More particularly, our invention has as its object the microbiological process for producing the ergot alkaloid ergocryptines by mean of a new microorganism *Claviceps purpurea* F.I. 101a (collection number of the strains of Società Farmaceutici Italia). *Claviceps purpurea* F.I. 101a has been deposited at the American Type Culture Collection (U.S.A.) receiving the index number ATCC 20019 and at the Commonwealth Mycological Institute (G.B.) receiving the index number IMI 126133. Ergocryptine belongs to the ergot alkaloids and gives upon hydrolysis lysergic acid, dimethylpyruvic acid, D-proline and l-leucine; the molecules thereof being bonded together by amidic bonds. Ergocryptine is usefully employed as hypertensive and in the therapy of peripheric vascular disturbances.

In literature are known some microbiological processes for the preparation of alkaloids belonging to the ergot group (Dutch Patents No. 6,415,127 and 6,405,662; U.S. Patents No. 3,117,917 and 3,110,651 and Japanese Patent No. 10,250/64) by means of which it is possible to obtain only mixtures of such alkaloids. We have surprisingly found, and this is an object of our invention, that by culturing the new microorganism *Claviceps purpurea* F.I. 101a it is possible to obtain ergocryptine substantially free from other alkaloids and that besides remarkable advantages in extraction and isolation, we obtain the ergocryptine in good yields in a highly purified state.

The new strain *Claviceps purpurea* F.I. 101a has been isolated from ergot sclerotium collected on a rye ear. It has the following morphological characteristics:

MICROSCOPIC ASPECT

On the usual solid cultural media, the mycelium shows hyphae which when young are long and thin with hardly evident and well spaced septa. Upon ageing the hyphae become larger, the septa become very evident and the various cells which constitute the hyphae swell. In young hyphae the length of the cells is 24–30$\mu$ and the diameter is 3–4$\mu$. Old cells are 10–14$\mu$ long and have a diameter of 4–5$\mu$. Sometimes the cells which constitute the old hyphae separate and around their terminal parts give rise to arthrospores which have dimensions not very different from the cells. Conidia are formed on top of many hyphae more or less quickly and more or less abundantly depending on the cultural medium. On some media, the conidia are roundish and on others clearly oval. The roundish conidia are about 5–7$\mu$ in diameter, and the oval conidia are about 6–8$\mu$ by 3–5$\mu$.

MACROSCOPIC ASPECT

The macroscopic characteristics had been observed on slants of the media as listed in Table 1, incubated at 28° C. for 8, 16, and 24 days.

TS medium:—Abundant growth, velvety aspect and white color which becomes violet on ageing. The aerial mycelium is abundant. The back side of the colony varies from colorless to violet. No soluble pigments are formed. Abundant conidia.

Agar potato glucose:—Sparse growth, abundant aerial mycelium, white, frequently fasciculated as coremi. The back side of the culture is colorless. Soluble pigments are absent. Abundant conidia.

T36 medium:—Good growth, with large folds, fair whitish aerial mycelium. The back side is colorless; soluble pigments are absent. Numerous conidia.

T31 medium:—Wrinkled, bright, whitish, fair growth. Aerial mycelium absent. Soluble pigments absent. Scarce conidia.

T25S medium:—Sparse growth, irregular, in little more or less dome-shaped colonies. Fair aerial mycelium of velvety aspect and pink color. Violet back side. Soluble pigments are absent. Abundant conidia.

S.P. medium:—Good growth, spread, slight relief, of velvety aspect and whitish color. Back side colorless. Soluble pigments absent. Conidia absent.

T22 medium:—Good growth, relief, whitish with colorless back side. Soluble pigments absent. Conidia absent.

| Compounds | TS | T25S | T36 | T31 | Potato glucose | SP | T22 |
|---|---|---|---|---|---|---|---|
| Saccharose, g | 100 | 300 | 200 | | | 300 | 100 |
| Glucose, g | | | | 300 | 20 | | |
| Asparagine, g | | 10 | | | | | |
| Meal hydrolysates | | | | | | | |
| Cotton seeds, g | | | | | 10 | | |
| Peptone, g | | | | | 2 | 10 | |
| Yeast extract, g | 0.1 | 0.1 | 60mg. | | | | |
| Citric acid, g | | 15 | 10 | | | | |
| Potato infusion ¹ ml | | | | | | 500 | |
| Grain chaff infusion,² ml | | | | | 500 | | |
| Corn steep, g | | | | | | | 25 |
| Potassium chloride, mg | | | 125 | 80 | | | |
| Potassium dihydrogen phosphate (KH$_2$PO$_4$), g | 0.5 | 0.5 | 0.35 | | | 0.5 | 0.5 |
| Magnesium sulphate (MgSO$_4$.7 H$_2$O), g | 0.3 | 0.5 | 0.35 | | | 0.5 | 0.3 |
| Ferrous sulphate (FeSO$_4$.7 H$_2$O), mg | 7 | 7 | 4 | | | 7 | |
| Zinc sulphate (ZnSO$_4$.7 H$_2$O), mg | 6 | 6 | 3 | | | 6 | |
| Agar, g | 20 | 20 | 20 | 20 | 20 | 20 | 20 |
| Distilled water | TO 11 | TO 11 | TO 11 | | | 1,000 ml. | |
| Tap water | | | | TO 11 | TO 11 | | 1,000 ml. |
| Aqueous ammonia | | (¹) | (¹) | | | | |
| NaOH | (¹) | | | | | | |
| pH | | | | | | | |

¹ To pH 5.2.
² 200 g. of potatoes are boiled for 45 minutes in 500 ml. tap water and filtered through gauze. The (infused) filtrate is made up to volume.
³ 200 g. of grain chaff (glumes) are boiled for 45 minutes in 5 liters tap water, filtered and made up to volume.

The process of the invention comprises cultivating the microorganism *Claviceps purpurea* F.I. 101a in a medium containing sources of carbon, nitrogen and mineral salts and then extracting the alkaloid. In greater detail, the microorganism is developed in a liquid cultural medium under aerobic conditions in submerged culture at from 20° to 30° C., preferably 24° C., for a period from 8 to 16 days. The pH may vary, according to the fermentation medium used, from 4 to 6.5. The carbon source may consist of glucose, saccharose, mannite, sorbite, glycerin, citric acid, succinic acid and other substances in common use. The nitrogen source may consist in ammonia, asparagine, peptone, casein hydrolysates and ammonium salts such as the sulphate and chloride and other substances of common use. Useful mineral salts vary according to the medium used and may comprise chlorides, phosphates, sulphates, magnesium, iron, zinc, manganese, and potassium.

The strain *Claviceps purpurea* F.I. 101a may be stored by lyophilization, using as suspending agent a liquid which consists of three parts of a 60% saccharose solution and 2 parts of milk. It may subsequently be transferred onto T36 medium (Table 1). The fermentation may be carried out in Erlenmeyer flasks and in laboratory or industrial fermentors of various capacity.

The quantity of the alkaloid present in the broth may be qualitatively determined by paper chromatography in comparison with a standard of ergocryptine and quantitatively by a spectrophometric method.

The following examples illustrate the invention.

Example 1

An ergot sclerotium from rye ear was washed thoroughly with tap water, dried and submerged for 2 minutes in a 5% solution of mercuric chloride ($HgCl_2$). After four successive washings with distilled sterile water, the sclerotium was divided into two parts which were then placed upon two slants of the T36 nutritive medium, having the composition listed in Table 1. The two slants were kept at 24° C. and then allowed to stand for 20 days. Every 4–5 days some drops of distilled sterile water were added to each slant so as to maintain the sclerotium fragment at high humidity. After 12 days, upon breaking the surface of the fragment, a tuft of a white mycelium was formed. This tuft was transferred by a handle onto another slant of T36 medium and incubated at 28° C. for 8 days.

The culture so obtained in a test tube was used for inoculating 300 ml. flasks containing 50 ml. of the following TG medium:

| | |
|---|---|
| Glucose g | 100 |
| Citric acid g | 10 |
| Yeast extract g | 0.1 |
| Potassium dihydrogen phosphate ($KH_2PO_4$) g | 0.5 |
| Magnesium sulphate ($MgSO_4 \cdot 7H_2O$) g | 0.3 |
| Ferrous sulphate ($FeSO_4 \cdot 7H_2O$) mg | 7 |
| Zinc sulphate ($ZnSO_4 \cdot 7H_2O$) mg | 6 |

Distilled water to 1000 ml.
pH 5.2, with ammonia.
Sterilization: 120° C. for 20 minutes.

The resulting innoculum was incubated for 6 days at 24° C. on a rotary shaker at 220 r.p.m. having a range of 4 cm. The cultures thus obtained consist of a well diffused mycelium, without pellets, and were used to inoculate 300 ml. flasks, each of which contained 45 ml. of the following T25 medium:

| | |
|---|---|
| Saccharose g | 300 |
| Citric acid g | 15 |
| Potassium chloride g | 0.125 |
| Potassium dihydrogen phosphate ($KH_2PO_4$) g | 0.5 |
| Magnesium sulphate ($MgSO_4 \cdot 7H_2O$) g | 0.5 |
| Ferrous sulphate ($FeSO_4 \cdot 7H_2O$) mg | 7 |
| Zinc sulphate ($ZnSO_4 \cdot 7H_2O$) mg | 6 |

Distilled water to 1000 ml.
Yeast extract, 0.1 g.
pH 5.2, with ammonia.
Sterilization: 100° C. for 20 minutes.

The inoculation quantity used was 5 ml. for each flask.

The resulting innoculum was incubated at 24° C. on a rotary shaker at 220 r.p.m. having a range of 4 cm. After 11–13 days of incubation, the cultures contained a quantity of alkaloid varying between 1200 and 1600 γ/ml.

The contents of 120 flasks were collected together. The 5 liters of the culture so obtained were filtered. The filtrate and the mycelium were extracted separately. The filtrate was adjusted to pH 9 with sodium carbonate and extracted with 5 liters of chloroform. The chloroform extract is reextracted with a 4% aqueous solution of tartaric acid. The tartaric solution was concentrated in vacuo at 20°–30° C. to ⅕ of the original volume, made alkaline to pH 9 and extracted with chloroform. The mycelium panel was treated with 50% aqueous acetone containing the 4% tartaric acid and filtered. The filtrate was made alkaline to pH 9 and extracted with chloroform. The chloroform extracts of the mycelium and of the filtrate were collected together and evaporated to dryness. 7.2 g. of a crude product so obtained were dissolved in benzene in the ratio of 1:20. The solution was decolorized with Darco carbon G–60, filtered and concentrated in vacuo to about 5–8 volumes of solvent per gram of alkaloid. After standing long at +5° C., the crystallized ergocryptine was collected and dried in vacuo at 45° C.

The product, crystallized from benzene, was dissolved with stirring in 1.5 volumes of boiling 90% aqueous methyl alcohol. The crystallization began immediately even in the warm and was completed while maintaining the methanolic solution at 0°–3° C. for 4 hous. The crystallized product was collected, washed with a small amount of cold methyl alcohol and dried at 100° C. in vacuo. 5.1 g. of ergocryptine were obtained.

Example 2

The operation was as in Example 1 with the difference that instead of starting from a sclerotium, a culture previously obtained from the sclerotium and stored by subsequent transfers on the T36 medium (Table 1) was used. Furthermore, instead of the T25 medium, the 668 medium was used which has the following composition:

| | |
|---|---|
| Saccharose g | 60 |
| Glycerine ml | 60 |
| Glucose g | 80 |
| Yeast extract g | 0.1 |
| Citric acid g | 15 |
| Potassium chloride KCl g | 0.125 |
| Potassium dihydrogen phosphate $KH_2PO_4$ g | 0.5 |
| Magnesium sulphate ($MgSO_4 \cdot 7H_2O$) g | 0.5 |
| Ferrous sulphate ($FeSO_4 \cdot 7H_2O$) mg | 7 |
| Zinc sulphate ($ZnSO_4 7H_2O$) mg | 6 |

Distilled water to 100 ml.
pH 5.2, with ammonia.
Sterilization: 100° C. for 20 minutes.

After 14 days of incubation, the cultures contain 1500 γ/cc. of ergocryptine.

Example 3

6 liters of TG medium (Example 1) were sterilized in a 10 liter fermentor by heating at 120° C. for 30 minutes. The medium was inoculated with 50 ml. of a suspension in water of conidia and mycelium obtained. 5 cultures of the strain *Claviceps purpurea* F.I. 101a were suspended in T36 medium (Table 1) in a test tube. The innoculum were incubated for 4 days at 24° C. with an aeration corresponding to 4 liters per minute and with a stroke of 300 r.p.m. of a rotary shaker having 6 blades. The cultures so obtained served to inoculate, in a ratio of 10%, 6 liters of T25 medium (Example 1) prepared and sterilized in another 10 liter fermentor. The innoculum is incubated at 24° C. with an aeration corresponding to 6 liters of air per minute with a stroke corresponding to 350 r.p.m. of a shaker provided with 6 blades. After 10 days incubation the culture contained 1100 γ/ml. of ergocryptine.

Example 4

The operation was carried out as in Example 3 with the difference that the process starts from 5 cultures in a test tube on the S.F. cultural medium. 1300 γ/ml. of ergocryptine were obtained.

Example 5

The operation was carried out as in Example 3 with the difference that when the process starts from 5 cultures in a test tube on the T22 cultural medium, 1250 γ/ml. of ergocryptine were obtained.

We claim:
1. A microbiologic process for the preparation of ergocryptine which comprises culturing the microorganism *Claviceps purpurea* F.I. 101a in submerged culture under aerobic conditions in a liquid nutritive medium containing a source of carbon, nitrogen, and mineral salts and thereafter recovering the ergocryptine from the cultured medium.

2. The process of claim 1 which is carried out at from 20 to 30° C. for from 8 to 16 days at a pH between 4 and 6.5.

References Cited

UNITED STATES PATENTS

| 3,110,651 | 11/1963 | Kybal et al. | 195—81 |
| 3,276,972 | 10/1966 | Amici et al. | 195—81 |

ALVIN E. TANENHOLTZ, Primary Examiner

U.S. Cl. X.R.

195—100